(12) United States Patent
Habel et al.

(10) Patent No.: US 8,340,524 B2
(45) Date of Patent: Dec. 25, 2012

(54) PROTECTED LIGHT SOURCE FOR MULTIPLE WAVELENGTH DIVISION MULTIPLEXED PASSIVE OPTICAL NETWORKS (WDM-PONS)

(75) Inventors: Richard Habel, Quebec (CA); Kim B. Roberts, Nepean (CA)

(73) Assignee: Rockstar Consortium US LP, Richardson, TX (US)

( * ) Notice: Subject to any disclaimer, the term of this patent is extended or adjusted under 35 U.S.C. 154(b) by 0 days.

(21) Appl. No.: 13/434,365

(22) Filed: Mar. 29, 2012

(65) Prior Publication Data

US 2012/0189309 A1    Jul. 26, 2012

Related U.S. Application Data

(63) Continuation of application No. 12/412,743, filed on Mar. 27, 2009, now Pat. No. 8,170,418.

(60) Provisional application No. 61/040,224, filed on Mar. 28, 2008.

(51) Int. Cl.
*H04J 14/02* (2006.01)

(52) U.S. Cl. .............................. 398/89; 398/82; 398/79

(58) Field of Classification Search .................... 398/89, 398/82, 79

See application file for complete search history.

(56) References Cited

U.S. PATENT DOCUMENTS 8,170,418 B2 * 5/2012 Habel et al. ..................... 398/89
2011/0026923 A1 * 2/2011 Kim et al. ........................ 398/79

OTHER PUBLICATIONS

Dong Jea Shin, "Low-Cost WDM-PON With Colorless Bidirectional Transceivers", Journal of Lightwave Technology, vo. 24, No. 1 Jan. 1, 2006, pp. 158-165.

* cited by examiner

*Primary Examiner* — Kinam Park
(74) *Attorney, Agent, or Firm* — Kent Daniels; Blake, Cassels & Graydon LLP

(57) ABSTRACT

A protected light source for generating seed light for at least two wavelength division multiplexed passive optical networks (WDM-PONs). The protected light source includes an optical coupler having $N \geq 2$ input ports and $M \geq 2$ output ports, each output port being optically connected to supply seed light to a respective set of one or more WDM-PONs. A respective multi-wavelength light source (MWLS) is optically coupled to supply seed light to each input port of the optical coupler. A controller unit controls operation of each multi-wavelength light source (MWLS).

20 Claims, 5 Drawing Sheets

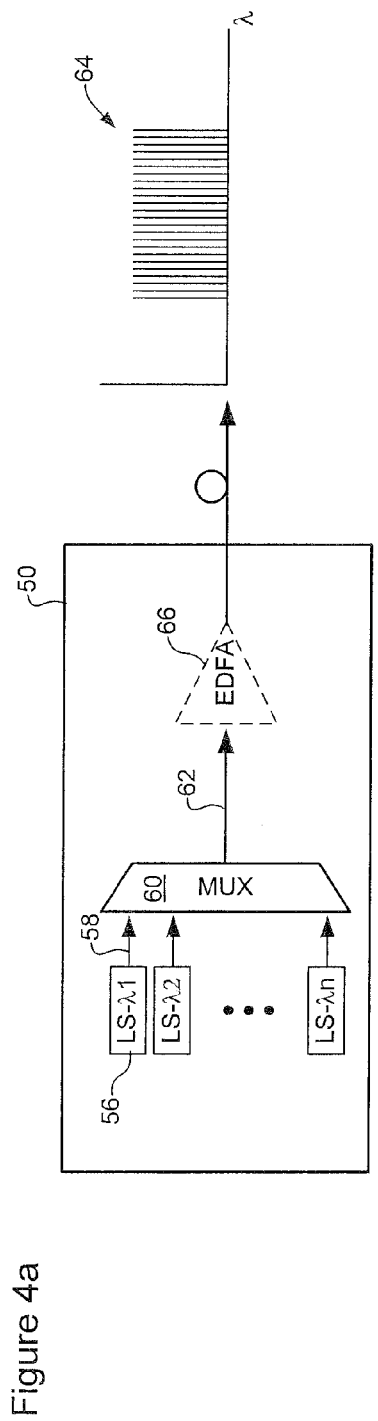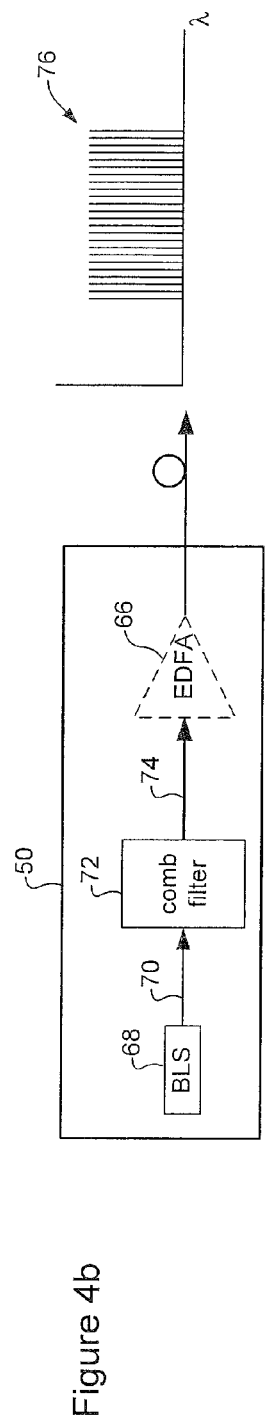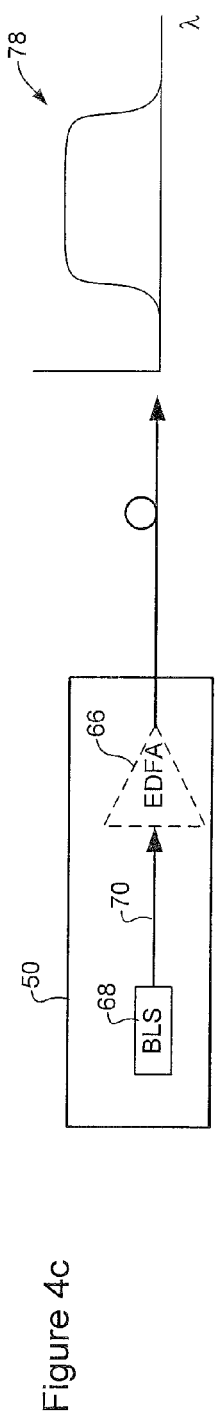

PROTECTED LIGHT SOURCE FOR MULTIPLE WAVELENGTH DIVISION MULTIPLEXED PASSIVE OPTICAL NETWORKS (WDM-PONS)

CROSS-REFERENCE TO RELATED APPLICATIONS

This application is a continuation application of U.S. patent application Ser. No. 12/412,743 filed Mar. 27, 2009 which claims benefit of U.S. Provisional Patent Application Ser. No. 61/040,224 filed Mar. 28, 2008. The entire content of both applications is hereby incorporated herein by reference.

MICROFICHE APPENDIX

Not Applicable.

TECHNICAL FIELD

The present invention relates to Passive Optical Networks, and more particularly, to a protected light source for multiple Wavelength Division Multiplexed Passive Optical Networks (WDM-PONs).

BACKGROUND OF THE INVENTION

A passive optical network (PON) is a point-to-multipoint network architecture in which unpowered optical splitters are used to enable a single optical fibre to serve multiple premises. A PON typically includes an Optical Line Terminal (OLT) at the service provider's central office connected to a number (typically 32-128) of Optical Network Terminals (ONTs), each of which provides an interface to customer equipment.

In operation, downstream signals are broadcast from the OLT to the ONTs on a shared fibre network. Various techniques, such as encryption, can be used to ensure that each ONT can only receive signals that are addressed to it. Upstream signals are transmitted from each ONT to the OLT, using a multiple access protocol, such as time division multiple access (TDMA), to prevent "collisions".

A Wavelength Division Multiplexing PON, or WDM-PON, is a type of passive optical network in which multiple optical wavelengths are used to increase the upstream and/or downstream bandwidth available to end users. FIG. 1 is a block diagram illustrating a typical WDM-PON system. As may be seen in FIG. 1, the OLT 4 comprises a plurality of transceivers 6, each of which includes a light source 8 and a detector 10 for sending and receiving optical signals on respective wavelength channels, and an optical combiner/splitter 12 for combining light from/to the light source 8 and detector 10 onto a single optical fibre 14. The light source 8 may be a conventional laser diode such as, for example, a distributed feed-back (DFB) laser, for transmitting data on the desired wavelength using either direct laser modulation, or an external modulator (not shown) as desired. The detector 10 may, for example, be a PIN diode for detecting optical signal received through the network. An optical mux/demux 16 (such as, for example, a Thin-Film Filter—TFF) is used to couple light between each transceiver 6 and an optical fibre trunk 18, which may include one or more passive optical power splitters (not shown).

A passive remote node 20 serving one or more customer sites includes an optical mux/demux 22 for demultiplexing wavelength channels ($\lambda 1 \ldots \lambda n$) from the optical trunk fibre 18. Each wavelength channel is then routed to an appropriate branch port 24 which supports a respective WDM-PON branch 26 comprising one or more Optical Network Terminals (ONTs) 28 at respective customer premises. In the WDM-PON of FIG. 1, one of the branches 26a includes a pair of ONTs 28, which share common uplink and downlink wavelength channels using, for example, a time division multiple access scheme well known in the art. Typically, each ONT 28 includes a light source 30, detector 32 and combiner/splitter 34, all of which are typically configured and operate in a manner mirroring that of the corresponding transceiver 6 in the OLT 4.

Typically, the wavelength channels ($\lambda 1 \ldots \lambda n$) of the WDM-PON are divided into respective channel groups, or bands, each of which is designated for signalling in a given direction. For example, C-band (e.g. 1530-1565 nm) channels may be allocated to uplink signals transmitted from each ONT 28 to the OLT 4, while L-band (e.g. 1565-1625 nm) channels may be allocated to downlink signals from the OLT 4 to the ONT(s) 26 on each branch 26. In such cases, the respective optical combiner/splitters 12, 34 in the OLT transceivers 6 and ONTs 286 are commonly provided as passive optical filters well known in the art.

The WDM-PON illustrated in FIG. 1 is known, for example, from "Low Cost WDM PON With Colorless Bidirectional Transceivers", Shin, D J et al, Journal of Lightwave Technology, Vol. 24, No. 1, January 2006. With this arrangement, each branch 26 is allocated a predetermined pair of wavelength channels, comprising an L-band channel for downlink signals transmitted from the OLT 4 to the branch 26, and a C-band channel for uplink signals transmitted from the ONT(s) 28 of the branch 26 to the OLT 4. The MUX/DEMUX 16 in the OLT 4 couples the selected channels of each branch 26 to a respective one of the transceivers 6. Consequently, each transceiver 6 of the ONT is associated with one of the branches 26, and controls uplink and downlink signalling between the ONT 4 and the ONT(s) 28 of that branch 26. Each transceiver 6 and ONT 28 is rendered "colorless", by using reflective light sources 8, 30, such as reflective semi-conductor optical amplifiers; injection-locked Fabry-Perot lasers; reflective electro-absorptive modulators; and reflective Mach-Zehnder modulators. With this arrangement, each light source 8, 30 requires a "seed" light which is used to produce the respective downlink/uplink optical signals. In the system of FIG. 1, the seed light for downlink signals is provided by an L-band broadband light source (BLS) 34 via an L-band optical circulator 36. Similarly, the seed light for uplink signals is provided by a C-band broadband light source (BLS) 38 via a C-band optical circulator 40. As is known in the art, the BLSs 34 and 38 may be broadband light emitting sources that generate a continuous spectrum, such as a Light Emitting Diode (LED), or may be a multi-frequency laser source which generates a plurality of narrow-band lights.

WDM-PONs suffer limitations in that the fibre trunk 18 and the BLSs 34,38 constitute single points of failure of the entire network. A failure of any one of these components effectively disconnects all subscribers.

A typical method for implementing WDM-PON protection is to duplicate the WDM-PON system of FIG. 1, with both systems being connected to the same ONTs 26. A less expensive alternative, which provides light source protection, is illustrated in FIG. 2. In the system of FIG. 2, the L-band and C-band BLSs 34 and 38 are protected by duplicating each BLS, and then routing light from a selected one of the two BLSs (for both uplink and downlink seed light) using an optical switch 46, as shown in FIG. 2. While this arrangement does provide protection for the L-band and C-band light sources, it also significantly increases the cost and complexity of the OLT 4.

SUMMARY OF THE INVENTION

An aspect of the present invention provides a protected light source for generating seed light for at least two wavelength division multiplexed passive optical networks (WDM-PONs). The protected light source includes an optical coupler having $N \geq 2$ input ports and $M \geq 2$ output ports, each output port being optically connected to supply seed light to a respective set of one or more WDM-PONs. A respective multi-wavelength light source (MWLS) is optically coupled to supply seed light to each input port of the optical coupler. A controller unit controls operation of each multi-wavelength light source (MWLS).

An advantage of the present invention is that distribution of light from each MWLS to all of the WDM-PONs is entirely passive, which reduces costs and improves reliability. In addition, a single protected light source can efficiently supply seed light to multiple WDM-PONs, which allows higher quality (and thus higher cost) MWLSs to be used, without increasing the cost of each WDM-PON, as compared to conventional solutions.

BRIEF DESCRIPTION OF THE DRAWINGS

Further features and advantages of the present invention will become apparent from the following detailed description, taken in combination with the appended drawings, in which:

FIGS. 4a-4c schematically illustrate respective multi-wavelength light sources usable in the embodiment of FIGS. 3.

It will be noted that throughout the appended drawings, like features are identified by like reference numerals.

DETAILED DESCRIPTION OF THE PREFERRED EMBODIMENT

Figure 5:
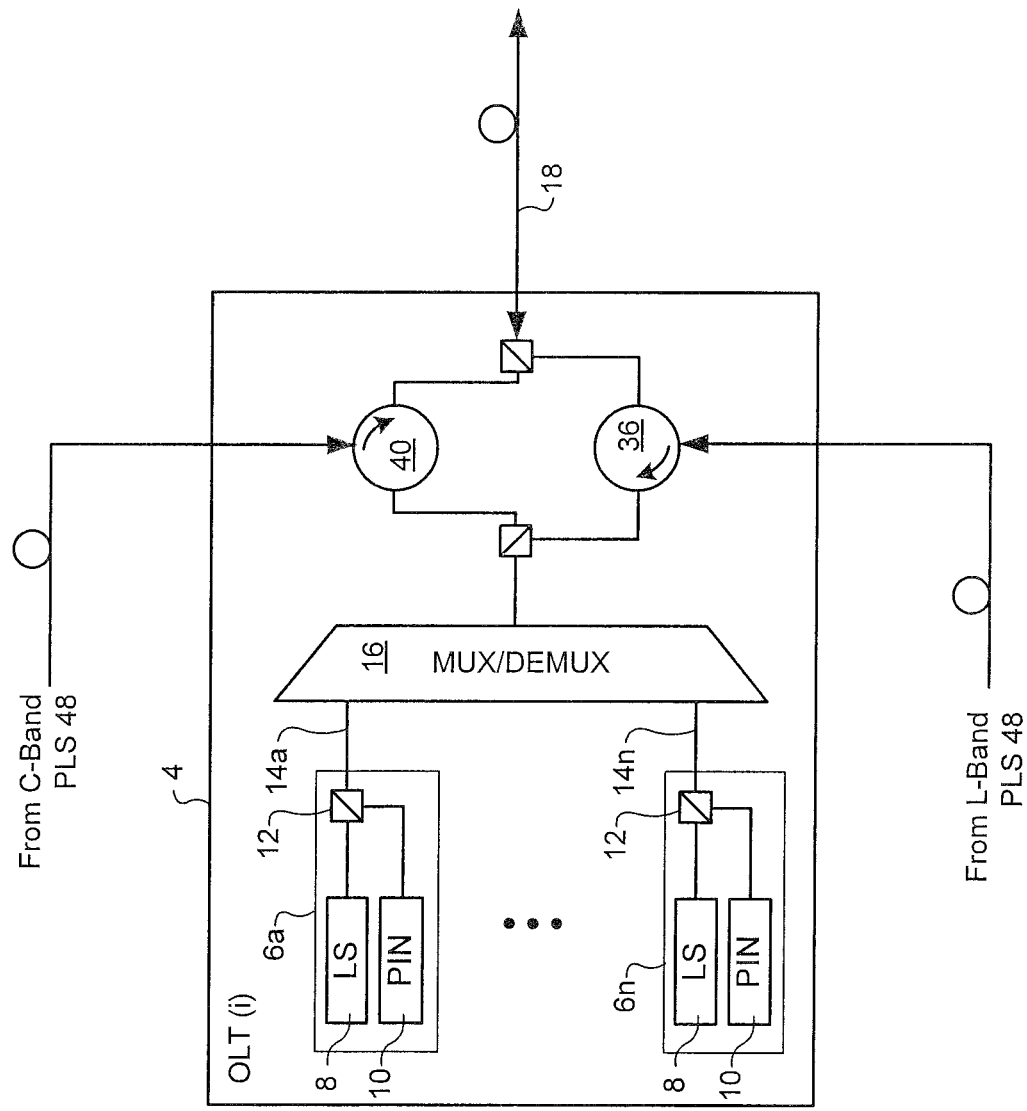
FIG. 5 is a block diagram schematically illustrating an Optical Line Terminal of a WDM-PON supplied using protected multi-wavelength light sources of the type illustrated in FIG. 3.

The present invention provides a protected multi-wavelength light source for multiple WDM-PONs. Representative embodiments are described below with reference to FIGS. 3-5.

Figure 3:
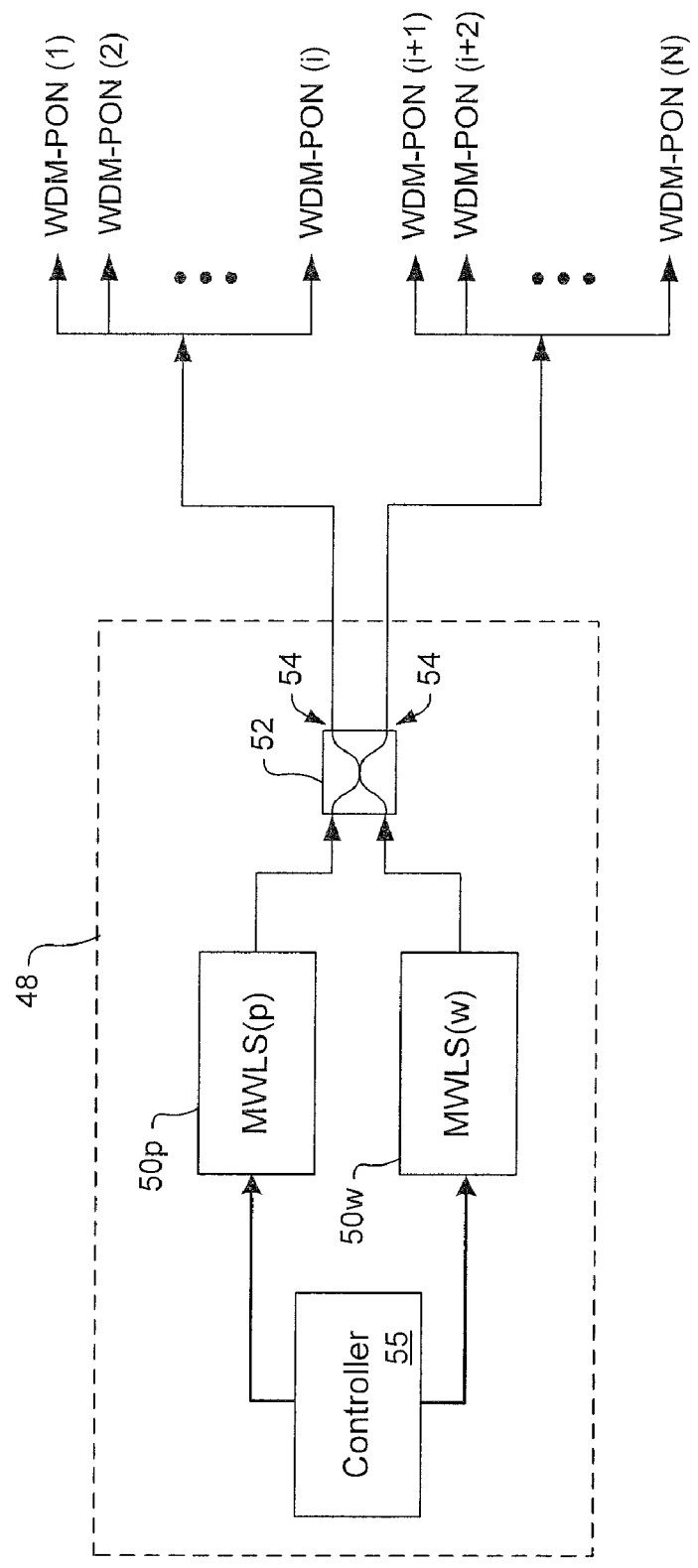
FIG. 3 is a block diagram schematically illustrating a protected multi-wavelength light source for multiple WDM-PONS in accordance with a representative embodiment of the present invention.

Referring to FIG. 3, a protected light source 48 comprises a pair of multi-wavelength light sources (MWLSs) 50 optically connected to respective input ports a 2×2 3 dB optical coupler 52 having two input ports and two output ports. Each of the output ports 54 of the optical coupler 52 is connected to supply seed light to a respective set of one or more WDM-PONs 2. A controller unit 55, which may include a microprocessor executing suitable software, controls operation of each of the MWLSs 50.

FIGS. 4a-c illustrate respective MWLSs 50 such as may be used in the protected light source 48 of the present invention. In the embodiment of FIG. 4a, the MWLS 50 comprises a set of narrowband light sources 56, each of which is driven to generate a narrowband continuous wave (CW) light 58 having a center wavelength corresponding to that of a predetermined one of the wavelength channels of the WDM-PONs 2. Each light source 56 may be a conventional laser diode such as, for example, a distributed feed-back (DFB) laser, but this is not essential. Other narrow band light sources, such as Fabry-Perrot lasers, Distributed Fabry-Perrot Resonators, Passive Mode-Locked Bulk Lasers, Active Mode-Locked Fiber Lasers and Dual-Beat Lasers, may be used. An optical MUX 60 (such as, for example, a Thin-Film Filter—TFF) is used to combine the CW light 58 from each light source 56 into a WDM seed light 62 having a spectrum shown generally at 64. If desired, an optical amplifier 66 (such as, for example, and Erbium Doped Fibre Amplifier—EDFA) may be used to increase the optical power of the WDM seed light 62.

In the embodiment of FIG. 4b, the MWLS 50 comprises a broadband light source 68 which is driven to generate a broadband continuous wave (CW) light 70 having a bandwidth corresponding with that of a predetermined one of the channel bands of the WDM-PONS 2. For example, the bandwidth of the CW light 70 may correspond with either one of the C-band or L-Band channels of the WDM-PONs 2. If desired, the broadband light source 68 may be an Erbium Doped Fibre Amplifier (EDFA) generating Amplified Spontaneous Emission (ASE), or a superluminescent light emitting diode (LED) having a suitable spectral response, but this is not essential. A comb filter 72 (such as, for example, a Thin-Film Filter—TFF) is used to filter the CW light 70 to generate a WDM seed light 74 having a spectrum shown generally at 76. As in the embodiment of FIG. 4a, the WDM seed light 74 output from the comb filter 72 comprises a plurality of narrowband CW lights, each of which has a center wavelength corresponding to that of a predetermined one of the wavelength channels of the WDM-PONs 2. Here again, an optical amplifier 66 (such as, for example, and Erbium Doped Fibre Amplifier—EDFA) may be used to increase the optical power of the WDM seed light 62, if desired.

FIG. 4c illustrates a further alternative, in which the MWLS 50 comprises a broadband light source 68 which is driven to generate a broadband continuous wave (CW) light 70 as described above. In this case, however, the broadband CW light 70, which has a spectrum shown generally at 78, is output directly to the four-port 3 dB optical coupler 52. An optical amplifier 66 (such as, for example, and Erbium Doped Fibre Amplifier—EDFA) may be used to increase the optical power of the broadband CW light 70, if desired. This embodiment relies on the MUXs 16 and 22 (FIGS. 1 and 2) of each WDM-PON 2 to provide the required filtering such that a narrow band seed light is supplied to each of the transceivers 6 and 28.

2×2 3 dB optical couplers are known in the art. In fact, most commercially available 3 dB optical power splitter/combiners are actually 2×2 devices, in which light injected into either one of the two input ports is evenly distributed between both of the two output ports. In the present invention, this fact is exploited to such that seed light from an MWLS 50 connected to either input port will seed all of the WDM-PONs 2 connected downstream of the optical coupler 52. Thus, the controller 55 can designate one of the two MWLSs 50 as a "working" MWLS, and designate the other MWLS 50 as a "protection" MWLS. Recovery from a failure of the "working" MWLS can then be accomplished simply by disabling the (failed) "working" MWLS while simultaneously enabling the "protection" MWLS. As may be appreciated, the controller unit 55 can readily perform this operation at high speed. Because no optical switching is required to facilitate the protection switching function, optical losses associated with the presence of an optical switch are avoided. Similarly, because both output ports 54 of the four-port 3 dB optical coupler 52 are coupled to a set of WDM-PONs 2, all of the seed light output by any given MWLS 50 is used, so that the 3 dB optical penalty normally associated with the use of an optical coupler is also avoided.

In preferred embodiments, a respective protected light source 48 will be provided to supply C-band and L-band seed lights to the WDM-PONs 2. As may be seen in FIG. 5, each of the WDM-PONs 2 can be topologically similar to that illustrated in FIG. 1, except that the respective Optical Line Terminal (OLT) 4 of each WDM-PON 2 does not have its own C-band and L-band seed light sources 34, 38 (see FIG. 1). Instead, C-band and L-band seed light for all of the WDM-PONs 2 is obtained from respective C-band and L-band protected light sources 48. This arrangement is particularly beneficial in a network node comprising multiple OLTs 4, each of which hosts a respective WDM-PON 2. Such network nodes typically are organized into one or more shelves, with each shelf containing a plurality (e.g. 16 or more) OLTs. In this application, a common protected light source 48 can be used to provide seed light to all of the OLTs 4 on a given shelf. In some embodiments, a common protected light source 48 may be used to provide seed light to OLTs 4 on two or more shelves. In still further embodiments, a common protected light source 48 may be used to provide seed light to OLTs 4 in different central offices.

Figure 1:
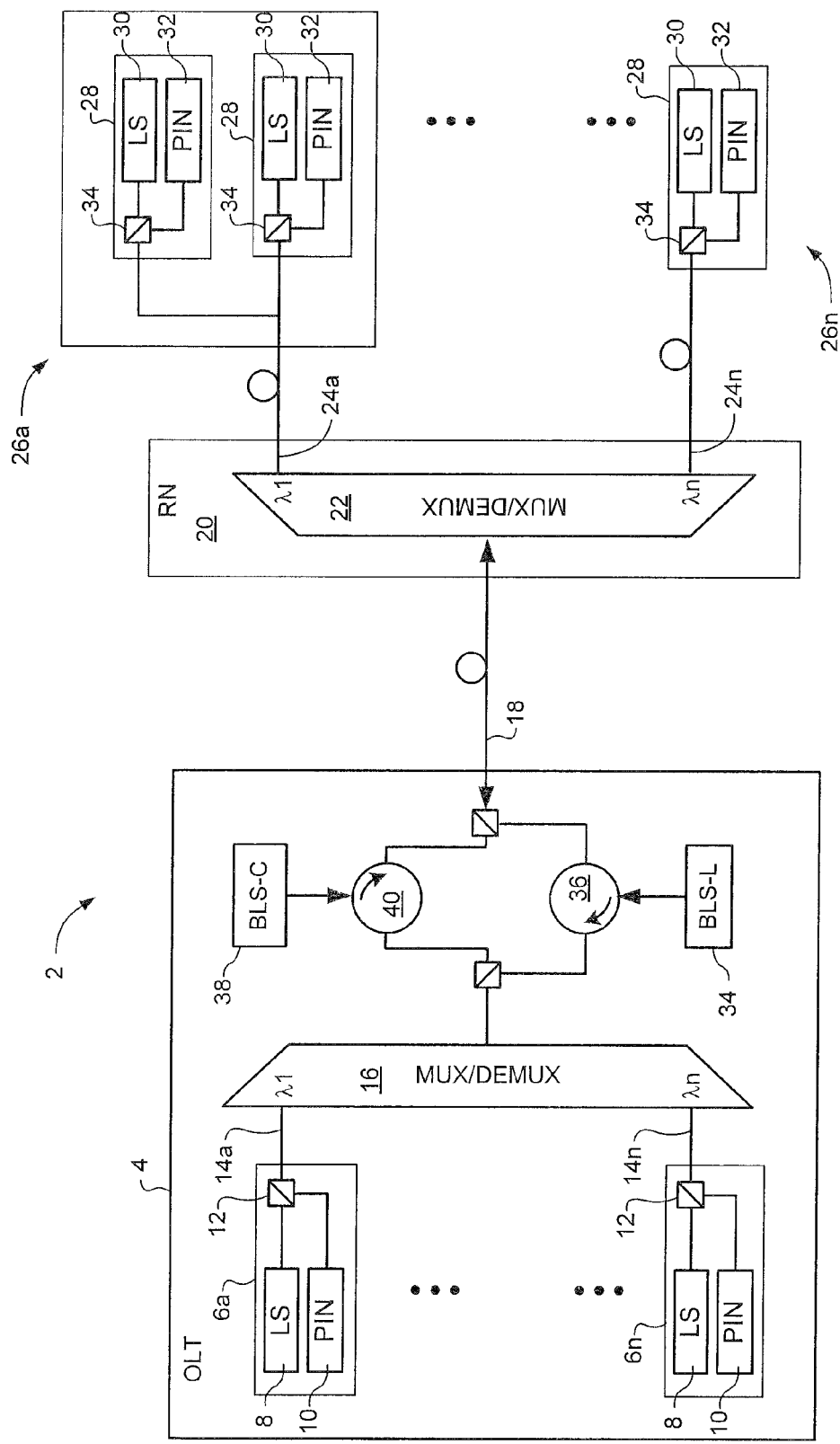
FIG. 1 is a block diagram schematically illustrating a conventional WDM-PON known in the prior art.
Figure 2:
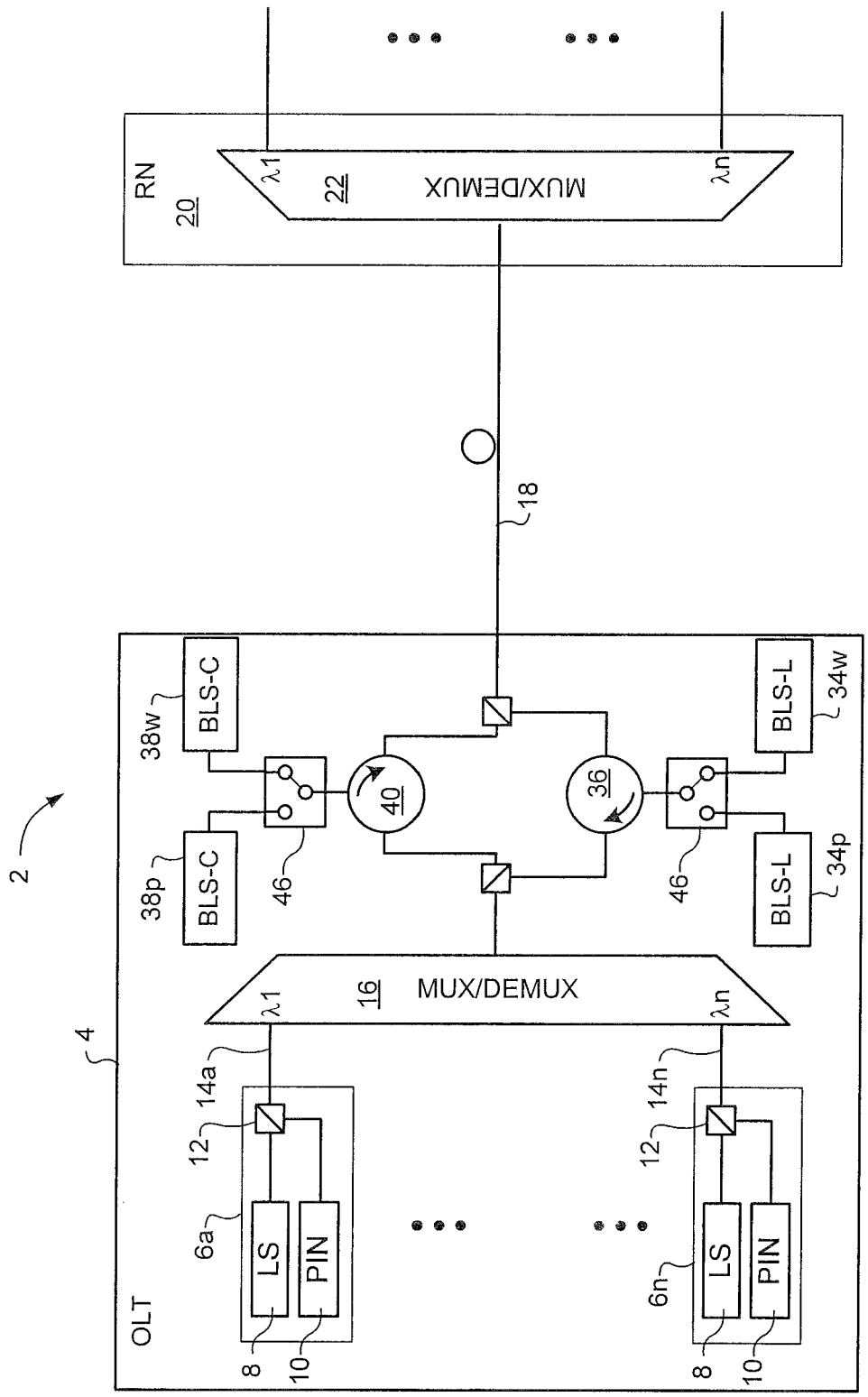
FIG. 2 is a block diagram schematically illustrating conventional techniques for protecting the fibre trunk and Broadband Light Sources of the WDM-PON of FIG. 1.

As may be appreciated, because the a common protected light source 48 supplies seed light to multiple ONTs 4, the costs of the light source 48 can also be shared across all of the involved WDM-PONs 2. Consequently, higher quality (and thus higher cost) components can be used in the protected light source 48 than would be economical in an arrangement in which each OLT 4 has its own seed light sources 34, 38, as shown in FIGS. 1 and 2.

In the forgoing description, a 2×2 3 dB coupler 52 is used to distribute seed light from two MWLSs 50 to a plurality of WDM-PONs. Those of ordinary skill in the art will recognise that other passive combiner/splitter devices may be used, without departing from the present invention. In fact, the coupler 52 can be provided as any passive N×M coupler, in which light from any one of N input ports is evenly distributed to each of the M output ports. In the examples described above with reference to FIGS. 3-5, N=M=2. However, more generally, any coupler in which N≧2 and M≧2 can be used. It is not necessary for N=M.

The embodiment(s) of the invention described above is(are) intended to be exemplary only. The scope of the invention is therefore intended to be limited solely by the scope of the appended claims.

We claim:

1. A protected light source for an optical communication network, comprising:
a passive optical coupler having at least two input ports and at least one output port, each output port being optically coupled to a respective branch of the optical network;
at least two light sources, each light source optically coupled to a respective input port of the optical coupler; and
a controller connected to each light source and configured to cause at least one light source to supply light to the coupler in a normal operation mode, and to cause at least one other light source to supply light to the coupler in a protection mode.

2. The protected light source of claim 1, wherein each light source is a multi-wavelength light source.

3. The protected light source of claim 2, wherein each light source is configured to emit light in a wavelength band corresponding to a channel band of the optical communication system.

4. The protected light source of claim 2, wherein each light source is configured to emit light at a plurality of distinct wavelengths within a wavelength band corresponding to a channel band of the optical communication system, each distinct wavelength corresponding to a wavelength channel of the optical communication system.

5. The protected light source of claim 4, wherein each light source comprises a broad band light source and a comb filter.

6. The protected light source of claim 4, wherein each light source comprises a plurality of narrow band optical emitters, each optical emitter operable to emit at a respective discrete wavelength.

7. The protected light source of claim 1, wherein the controller is configured, in response to failure of the at least one light source supplying light to the coupler in normal operation mode, to cause the at least one other light source to supply light to the coupler in the protection mode.

8. The protected light source of claim 7, wherein the controller is configured, in response to failure of the at least one light source supplying light to the coupler in normal operation mode to disable operation of the at least one light source supplying light to the coupler in normal operation mode.

9. The protected light source of claim 1, wherein the optical coupler has multiple output ports each for coupling to a respective branch of the optical network.

10. The protected light source of claim 1, wherein each light source is configured to supply seed light for a wavelength division multiplexed passive optical network (WDM-PON).

11. A method of operating a protected source of light for an optical communication network, the method comprising:
optically coupling each of at least two light sources to a respective input port of a passive optical coupler, the passive optical coupler having at least two input ports and at least one output port, each output port being optically coupled to a respective branch of the optical network;
controlling at least one light source to supply light to the coupler in a normal operation mode; and
controlling at least one other light source to supply light to the coupler in a protection mode.

12. The method of claim 11, wherein each light source is a multi-wavelength light source.

13. The method of claim 12, wherein each light source is configured to emit light in a wavelength band corresponding to a channel band of the optical communication system.

14. The method of claim 12, wherein each light source is configured to emit light at a plurality of distinct wavelengths within a wavelength band corresponding to a channel band of the optical communication system, each distinct wavelength corresponding to a wavelength channel of the optical communication system.

15. The method of claim 14, wherein each light source comprises a broad band light source and a comb filter.

16. The method of claim 14, wherein each light source comprises a plurality of narrow band optical emitters, each optical emitter configured to emit at a respective discrete wavelength.

17. The method of claim 11, comprising controlling the at least one other light source in response to failure of the at least one light source supplying light to the coupler in normal operation mode, to cause the at least one other light source to supply light to the coupler in the protection mode.

18. The method of claim 17, comprising controlling the at least one light source in response to failure of the at least one light source supplying light to the coupler in normal operation mode to disable operation of the at least one light source supplying light to the coupler in normal operation mode.

19. The method of claim 11, wherein the optical coupler has multiple output ports each for coupling to a respective branch of the optical network.

20. The method of claim 11, comprising operating the protected source of light to supply seed light for a wavelength division multiplexed passive optical network (WDM-PON).

* * * * *